United States Patent
Kawasaki et al.

(10) Patent No.: US 6,765,972 B1
(45) Date of Patent: Jul. 20, 2004

(54) CARRIER SYNCHRONIZATION TYPE DEMODULATOR FOR PSK SIGNAL

(75) Inventors: Yusuke Kawasaki, Kawasaki (JP); Yoshiyasu Sugimura, Kawasaki (JP); Shigeru Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/503,357

(22) Filed: Feb. 14, 2000

(30) Foreign Application Priority Data

Jul. 30, 1999 (JP) .......................................... 11-217132

(51) Int. Cl.[7] .............................................. H04L 27/22
(52) U.S. Cl. ...................... 375/329; 375/326; 375/369; 329/304
(58) Field of Search ................................ 375/322, 324, 375/326, 329, 340, 354, 362, 369; 329/304, 307, 308, 345

(56) References Cited

U.S. PATENT DOCUMENTS 3,571,712 A * 3/1971 Hellwarth et al. .......... 375/328
5,907,671 A * 5/1999 Chen et al. .................... 714/6
6,130,577 A * 10/2000 Tamba et al. ............... 329/304

FOREIGN PATENT DOCUMENTS

JP A-55-30232 3/1980

* cited by examiner

Primary Examiner—Young T. Tse
Assistant Examiner—David B. Lugo
(74) Attorney, Agent, or Firm—Armstrong, Kratz, Quintos, Hanson & Brooks, LLP

(57) ABSTRACT

A proximity IC card (PICC) which relates to and provides a carrier synchronization type demodulator, which is able to stably receive a PSK signal from a PICC and is enhanced in noise immunity, and which is realized at a low cost and in such a way as to have a small size. The carrier synchronization type demodulator is adapted to receive and demodulate PSK-modulated subcarrier signals to be synchronized with and superposed onto a sent carrier signal. This demodulator includes a carrier detecting device for detecting the subcarrier signals successively received in a predetermined time, a phase-change-point detecting device for detecting a phase change point of the subcarrier signal after the subcarrier signal is detected, and a data reception control device for controlling the reception of data of a predetermined format by employing a moment, at which the phase change point is detected, as a synchronization start point for receiving data, and by using an internal clock that is synchronized with the sent carrier signal by using the moment as a starting point of synchronization.

6 Claims, 10 Drawing Sheets

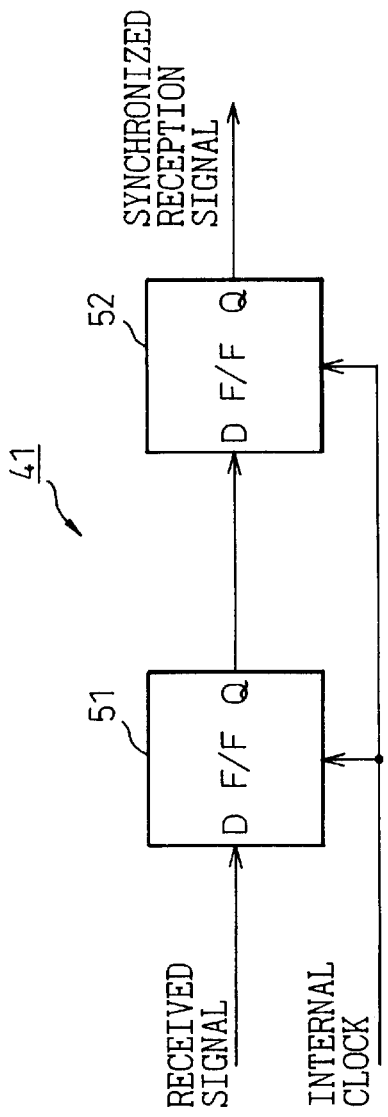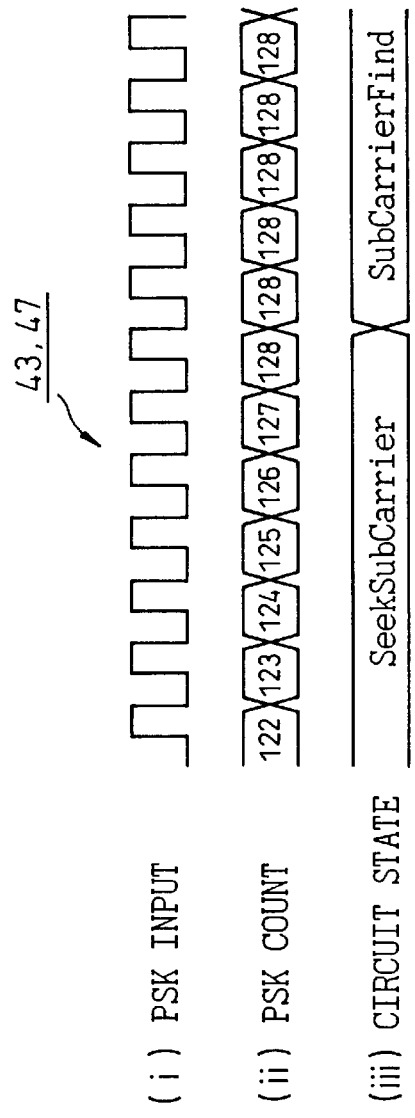

CARRIER SYNCHRONIZATION TYPE DEMODULATOR FOR PSK SIGNAL

BACKGROUND OF THE INVENTION

1. Field of the Invention

The present invention generally relates to a proximity IC card (hereinafter sometimes abbreviated to "PICC") and, more particularly, to a carrier synchronization type modulator for receiving a phase-shift-keying (PSK) (modulated) signal sent from a PICC in a PICC reader/writer (hereinafter abbreviated as PICC-R/W) for writing data to and reading data from the PICC.

2. Description of the Related Art

PICC standards are described in ISO/IEC (International Organization for Standardization/International Electrotechnical Commission) 14443. Hereinafter, in relation to the present invention, a brief description is given about part of ISO/IEC 14443, which relates to a type-B communication interface for a PICC and which describes the properties and characteristics of a field that provides power transmission and bidirectional communication between a PICC and a proximity coupling device (hereunder abbreviated to PCD), such as the PICC-R/W.

(1) Power Transmission from PCD to PICC

To supply effective power to the PICC in a radio frequency (RF) operating field, a carrier (having a carrier frequency of $f_c$=13.56 MHz) is transmitted from the PCD to the PICC, whereupon the received carrier is rectified to thereby generate electric power needed for an operation of an internal circuit.

(2) Communication from PCD to PICC

The PCD transmits data to the PICC by amplitude-shift-keying (ASK) modulating the amplitude of the carrier with a modulation index of 10% at a data bit rate of 106 Kbps (=$f_c$/128).

(3) Communication from PICC to PCD

The PICC transmits data to the PCD by performing load modulation of a load for reception of the carrier at a frequency $f_s$ (=$f_c$/16), which is (1/16) the carrier frequency, to thereby generate a subcarrier (whose frequency $f_s$=847 kHz), and by then binary-phase-shift-keying (BPSK) modulating the phase of the subcarrier at a data bit rate of 106 Kbps (=$f_c$/128).

FIG. 1 schematically shows an example of a PICC.

In the case of the example of FIG. 1, two chips respectively constituting a central processing unit (CPU) portion 11 and an RF portion 12 are incorporated into a card body 10. Further, an antenna (AT) 13, wound like a coil, is disposed along the periphery of the card body 10. The CPU portion 11 is constituted by what is called a one-chip computer and includes a CPU, memories such as a ROM, a RAM, and an EEPROM, and an input/output (I/O) interface.

FIG. 2 shows an example of the communication interface between a PCD and a PICC.

In the case of the communication from the PCD to the PICC, which has been described in the foregoing section (2), a modulation portion (MOD) 20 of the PCD performs ASK modulation of the amplitude of a carrier (having the carrier frequency of $f_c$=13.56 MHz) with a modulation index of 10%. Then, a resultant signal is transmitted from the PCD to the PICC through output amplifiers 22 and 23 and an antenna 24.

In contrast, in the case of the communication from the PICC to the PCD, which has been described in the foregoing section (3), a load 26 for reception of an RF signal is varied under the control of a modulation portion (MOD) 28 of the RF portion 12 of the PICC shown in FIG. 1. Then, a BPSK modulation for providing binary phase information (representing 0 or 180 degrees) is performed on a subcarrier (whose frequency $f_s$ =847 KHz) generated by a load modulation (resulting in an amplitude modulation (hereunder referred to as an AM modulation)).

The modulated signal is transmitted to the PCD through an antenna 25 (corresponding to the antenna 13 of FIG. 1). Actually, a detection portion (DET) 21 of the PCD detects the carrier that is outputted by the PCD itself and that undergoes the load modulation (including the BPSK modulation) performed by the PICC, as illustrated in FIG. 2.

FIG. 3 shows an example of a conventional demodulator.

A demodulator 30 is placed at the rear stage of the detection portion 21 of FIG. 2. A PSK-modulated carrier signal is shaped into (whose frequency $f_s$=847 KHz) the digital form (namely, a binary signal) in the detection portion 21 and inputted to the demodulator 30. In the demodulator 30, a frequency doubler 31 of a first stage thereof first doubles the frequency of the received signal so as to reproduce a received subcarrier.

Subsequently, a phase lock loop (PLL) circuit consisting of a phase comparator 32, a low-pass filter (LPF) 33, and a voltage-controlled oscillator (VCO) 34 synchronizes a signal having a period being double the period of a subcarrier, which is produced in the demodulator, with the frequency-doubled signal. Then, the frequency of the former signal is divided by 2 by a divide-by-2 frequency divider 35. Consequently, a demodulation clock phase-synchronized with the received subcarrier is generated.

Further, the BPSK-modulated data signal (having a data bit rate of 106 kbps) representing data, whose 1 bit width corresponds to 8 periods of the subcarrier, is demodulated by sampling the received signals at a leading or trailing edge of the subcarrier signal produced in the demodulator.

FIGS. 4A and 4B illustrate an example of a demodulation operation performed by the sampling of the received signals.

FIG. 4A illustrates such a demodulation operation in the case of normal reception of the BPSK-modulated signal. In this case, 8 subcarriers constituting each bit width of the received PSK signal are sampled at a correct logic level. In contrast, FIG. 4B illustrates such a demodulation operation in the case that external noise affects the BPSK-modulated signal. In this case, the level of the received PSK signal varies owing to the noise, so that the received signal (namely, an output of the comparator), which is erroneously shaped in waveform, is sampled. In the case of this example, unnecessary waveform distortion occurs at a data bit having a logical level "0". This results in erroneous reception of the signal. Consequently, a malfunction of the demodulator 30 occurs.

Thus, the conventional demodulator has drawbacks in that waveform distortion is liable to occur in a demodulation signal when it is affected by a spatial noise, and that the demodulator has low noise immunity. Further, as is apparent from the constitution of the conventional demodulator of FIG. 3, the conventional demodulator has drawbacks in that when a phase delay is introduced in the received PSK signal, the demodulator sometimes fails as a result of the follow-up time of the PLL in demodulating the received PSK signal by utilizing an output of the VCO and that thus, an erroneous code is outputted. This phase delay is regularly caused therein. Thus, a phase compensation circuit is required to compensate for the phase delay by circuit means.

Consequently, the conventional demodulator has drawbacks in that the demodulator does not meet demands for reductions in the cost and the size thereof.

SUMMARY OF THE INVENTION

In view of the aforementioned drawbacks of the conventional demodulator, the present invention is accomplished by paying attention to the fact that the received subcarrier signal is synchronized with the carrier signal outputted by the PCD in the case of the demodulator for a PSK signal in the PICC.

Accordingly, an object of the present invention is to provide a carrier synchronization type demodulator for a PSK signal, which performs sampling by using a signal synchronized with an own carrier signal without using the conventional PLL circuit, and by then detecting a sampling start point and performing a majority decision on a result of the sampling so as to ensure more stable demodulation.

Further, an object of the present invention is to provide a carrier synchronization type demodulator for a PSK signal, which is enabled to stably receive continuous data arranged at indefinite data intervals by suitably performing an operation of detecting the sampling start point.

Furthermore, an object of the present invention is to provide a carrier synchronization type demodulator, which meets the demand for a low-cost small-sized demodulator that is applicable to various fields of a proximity IC card, by eliminating the necessity of the conventional PLL circuit.

To achieve the foregoing objects, according to the present invention, there is provided a carrier synchronization type demodulator for a PSK signal, which receives and demodulates PSK-modulated subcarrier signals synchronized with and superposed onto a sent carrier signal. This demodulator comprises carrier detecting means for detecting the subcarrier signals successively received in a predetermined time, phase-change-point detecting means for detecting a phase change point of the subcarrier signal after the subcarrier signal is detected, and data reception control means for controlling the reception of data of a predetermined format by employing a moment, at which the phase change point is detected, as a synchronization start point for receiving data, and by using an internal clock (signal) that is synchronized with the sent carrier signal by using the moment as a starting point of synchronization.

An embodiment of this demodulator further comprises majority decision means for making a majority decision on a plurality of values respectively represented by sampled subcarrier signals, which provide logical values "0" and "1" of data bits during data is received, and for deciding that the logical value "0" or "1" of the majority of the data bits is set to be the logical value of each thereof.

The majority decision means of this embodiment may output reception error information in the case that the number of the data bits having the logical value "0" is equal to the number of the data bits having the logical value "1" when the majority decision is made. Alternatively, the majority decision means of this embodiment may determine a comparison ratio between the number of the data bits having the logical value "0" and the number of the data bits having the logical value "1" and output reception error information when the ratio is within a predetermined range.

Another embodiment of the demodulator further comprises determination means for determining, immediately upon completion of reception of a data frame of the predetermined format, whether not the reception of the next data frame has commenced. When the commencement of the reception of the next data frame is not detected, the phase-change-point detecting means immediately starts detecting a phase change point of the subcarrier signal.

In this embodiment, the data frame of the predetermined format is of the start-stop synchronization type (namely, the asynchronous type). Further, when the values of sampled subcarrier signals of the predetermined number immediately subsequent to a stop bit indicating the end of a data frame have the same logical value as that of the stop bit, the determination means determines that the commencement of the reception of the next data frame cannot be detected.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 6A is a diagram illustrating an example of PSK synchronization;

FIG. 6B is a diagram illustrating an example of an operation of sensing a subcarrier;

DETAILED DESCRIPTION OF THE PREFERRED EMBODIMENTS

Figure 5:
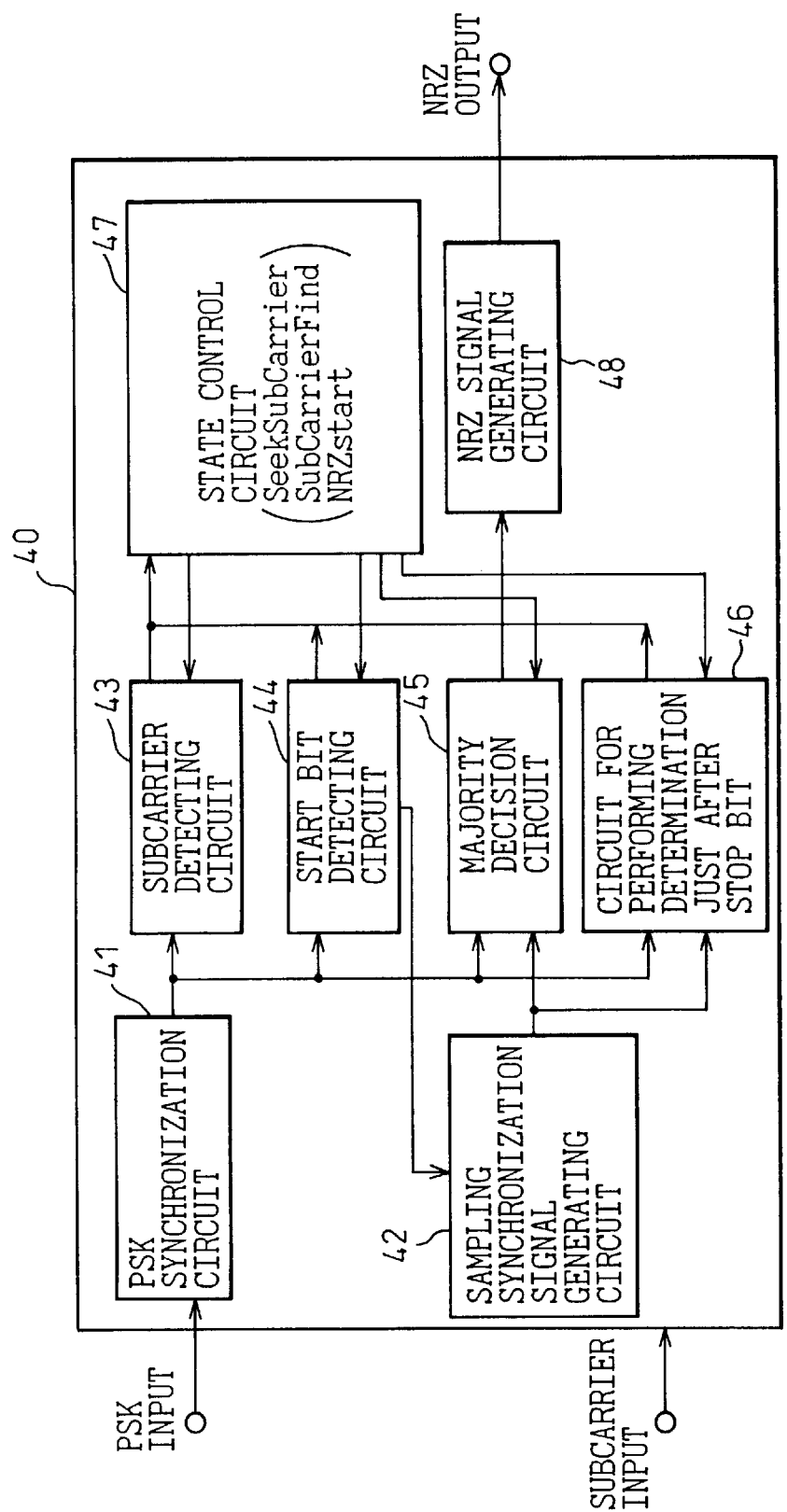
FIG. 5 is a diagram illustrating the basic constitution of a carrier synchronization type demodulator of the present invention for a PSK signal.

FIG. 5 shows the basic constitution of a carrier synchronization type demodulator for a PSK signal, which is an embodiment of the present invention. Further, FIGS. 6A to 11 illustrate operations of primary components of the demodulator shown in FIG. 5.

As described above, this demodulator 40 does not use the conventional PPL circuit. A carrier signal (whose carrier frequency $f_c=13.56$ MHz) to be outputted from this demodulator is generated by using internal clocks. Thus, an operation of this demodulator 40 according to the internal clocks is synchronized with the carrier signal. On the other hand, a PICC outputs a subcarrier signal (whose subcarrier frequency $f_s=f_c/16=847$ KHz), which is synchronized with the carrier signal.

Therefore, if only a phase change point of a PSK signal superposed onto the subcarrier signal, especially, a start bit is correctly detected, accurately sampled points are ensured in the subsequent data reception. Furthermore, as to spatial noise having no relation to the signal synchronization during the data reception, the noise immunity is enhanced by making a majority decision on N (incidentally, N: an integer) of PSK signals to be sampled within 1 bit width. Hereinafter, these operations will be described with reference to the preferred embodiments.

Incidentally, in the following description, examples of circuits will be described merely for the purpose of exemplifying operations and circuit scale of a demodulator of the present invention. In the case of actual circuit construction, logical design is performed by using programmable devices and the software therefor.

Figure 1:
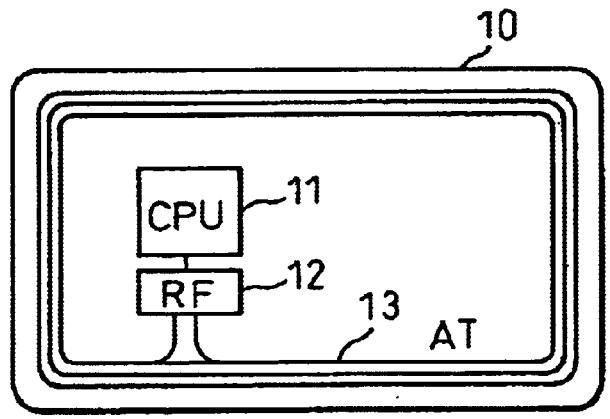
FIG. 1 is a diagram schematically illustrating the constitution of an example of a PICC.
Figure 2:
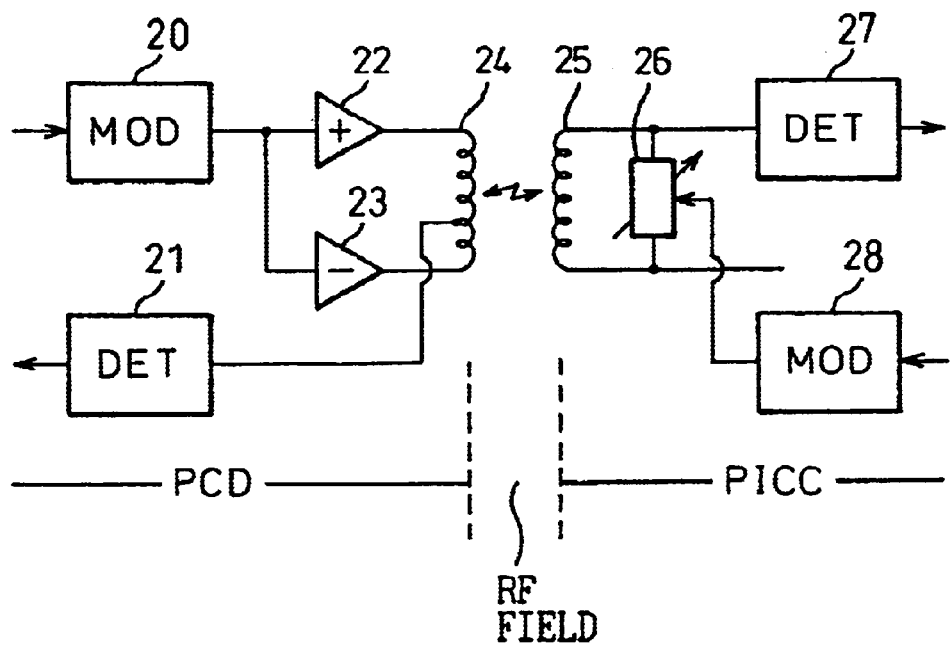
FIG. 2 is a diagram illustrating an example of the communication interface between a PCD and a PICC.
Figure 3:
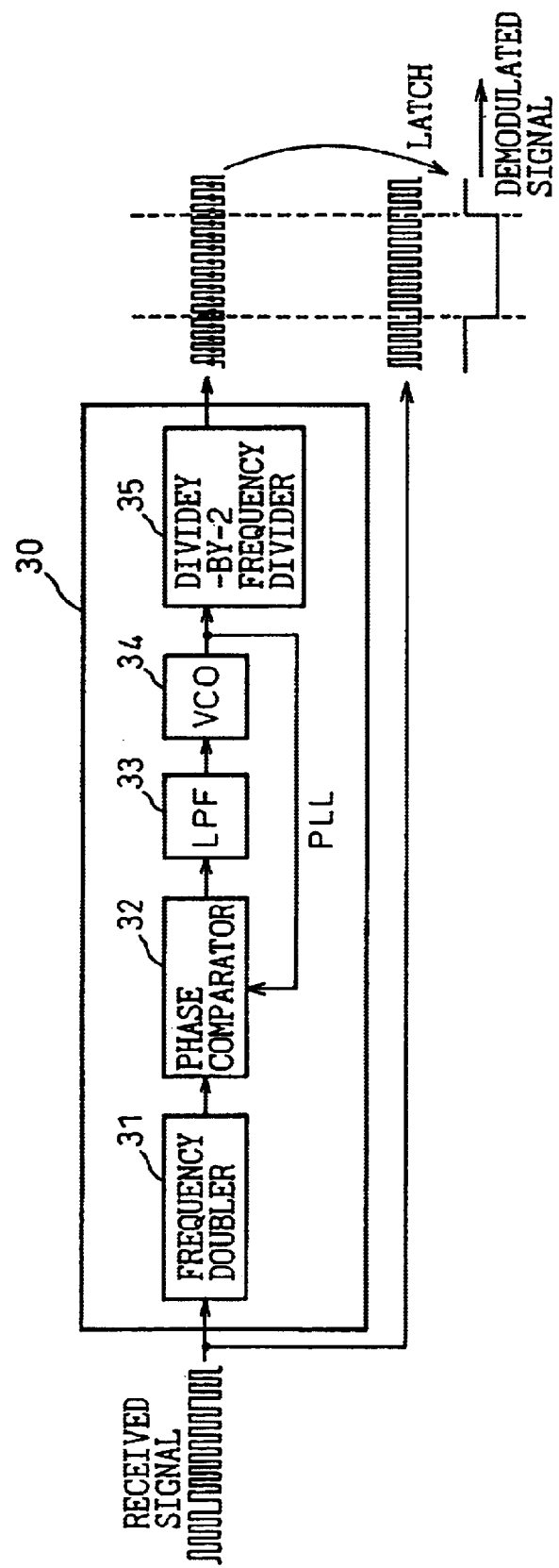
FIG. 3 is a diagram illustrating an example of a conventional demodulator.
Figure 4A:
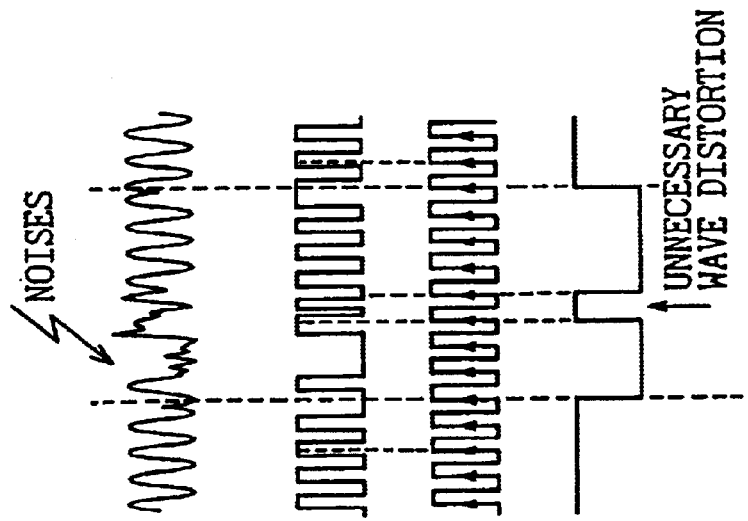
FIG. 4A is a diagram illustrating an example of a normal demodulation operation performed by the sampling illustrated in FIG. 3.
Figure 4B:
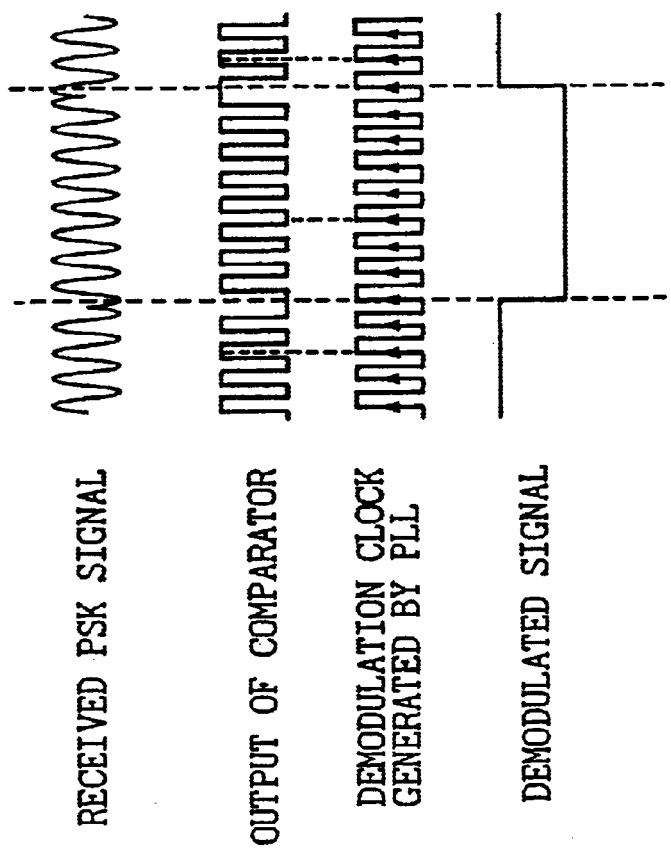
FIG. 4B is a diagram illustrating an example of an abnormal demodulation operation performed by the sampling illustrated in FIG. 3.

In the demodulator 40 of FIG. 5, a PSK synchronization circuit 41 waveforms a PSK signal (namely, the received signal shown in FIG. 3), which has been converted by the detection portion 21 into a digital value signal having a logical value, into a PSK signal synchronized with an internal clock. FIG. 6A shows of an example of the PSK signal synchronization circuit 41 that converts the received signal into a reception signal synchronized with the internal clock by the sampling using two stages respectively constituted by D-type flip-flop circuits 51 and 52. Consequently, phase variation as a result of the space propagation of the subcarrier and to the circuit of the detection portion 21 is compensated.

A subcarrier detecting circuit 43 senses from the presence or absence of a subcarrier whether or not a PICC is activated in the RF field under the control of a state control circuit 47. As shown in (iii) of FIG. 6B, the state control circuit 47 recognizes this initial state as a SeekSubCarrier state. Further, when successively and correctly receiving PSK signals from the PICC in a predetermined time (in this case, a time period of 150 μsec corresponding to 128 PSK signals), the subcarrier detecting circuit 43 decides that carrier synchronization is established between the PICC and the demodulator. Then, the subcarrier detecting circuit 43 sends a subcarrier detection signal to the state control circuit 47.

Thus, the state control circuit 47 causes the transition of a receiving state from the SeekSubCarrier state to a SubCarrierFIND state. Incidentally, the state control circuit 47 may be constituted by a sequential circuit including an ordinary flip-flop circuit. Alternatively, the state control circuit 47 may be constituted by firmware or software of a microprocessor.

When the demodulator enters the SubCarrierFIND state, a start bit detecting circuit 44 starts detecting a start bit. The start bit detecting circuit 44 monitors a change in the phase of the PSK signal in the SubCarrierFIND state. When detecting a phase change, the start bit detecting circuit 44 posts the detection of the start bit to the state control circuit 47. In response to this, the state control circuit 47 causes the transition of the receiving state from the SubCarrierFIND state to a NRZStart state.

Figure 7A:
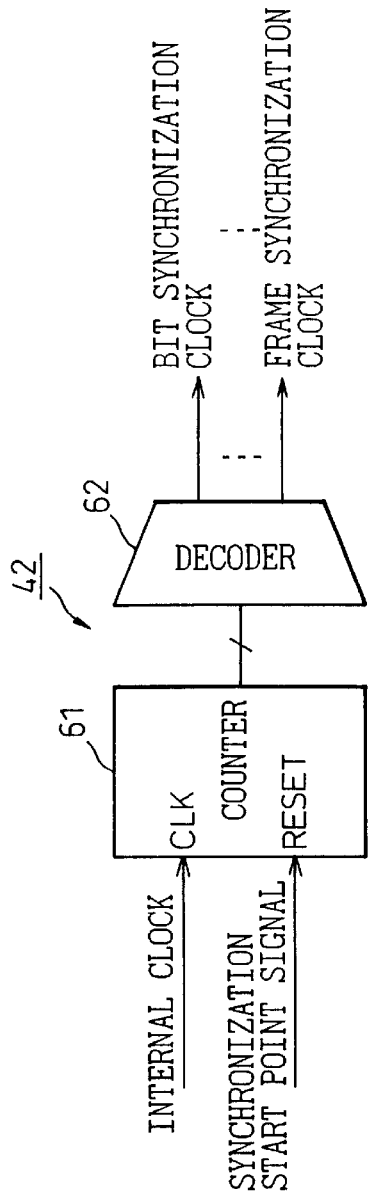
FIG. 7A is a diagram illustrating the constitution of an example of a sampling synchronization signal generating circuit.

Simultaneously, the start bit detecting circuit 44 gives a phase change detection signal (namely, a synchronization start point signal) to a sampling synchronization signal generating circuit 42. FIG. 7A shows the constitution of an example of the sampling synchronization signal generating circuit 42. In the case of this example, a counter 61 adapted to operate in synchronization with internal clocks is reset in response to the synchronization start point signal.

As a result, the counter 61 resumes counting by employing the synchronization start point signal as a starting point. A decoder 62 of the next stage generates a bit synchronization signal representing information, whose bit width is 1 (corresponding to 8 periods of the subcarrier signal), and a frame synchronization signal, which corresponds to a frame from a start bit to a stop bit in the case of start-stop synchronization, by employing a moment, at which the synchronization start point signal is inputted, as a reference.

An NRZ signal generating circuit 48 outputs the received PSK signal as NRZ reception data of the predetermined format by using clocks supplied from the sampling synchronization signal generating circuit 42.

Figure 8:
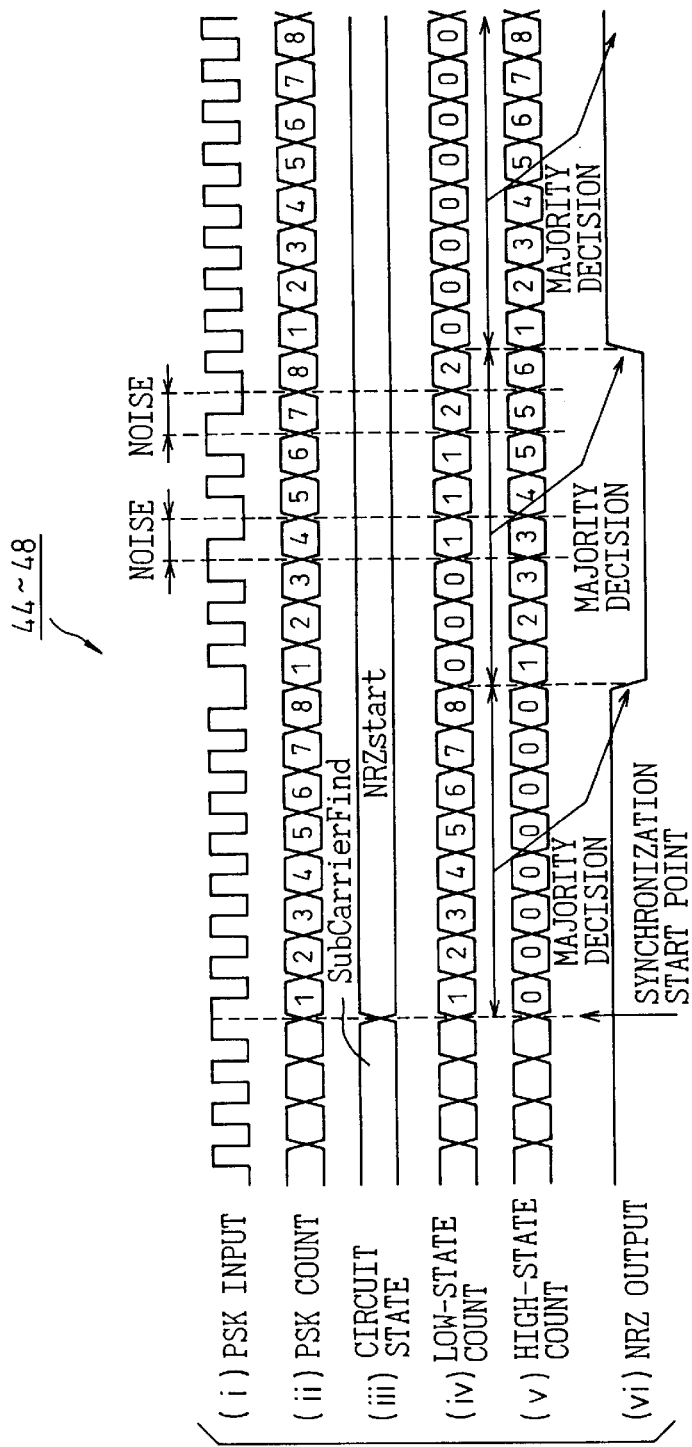
FIG. 8 is a time chart illustrating an example of a start-bit-detection/majority-decision operation.

FIG. 8 is a timing chart illustrating an example of the PSK-signal receiving timing in the case that the transition of the receiving state from the SubCarrierFIND state to the NRZStart state. When the start bit detecting circuit 44 detects a first phase change point in the SubCarrierFIND state, the transition of the state of the circuit of the demodulator therefrom to the NRZStart state is caused by employing the detected phase change point (see (iii) of this figure). As illustrated in FIG. 7A, a frame of the received PSK signal is constructed by using the bit synchronization signal and the frame synchronization signal that are generated by employing the synchronization start point as the reference.

In this embodiment of the present invention, as illustrated in (iv) and (v) of FIG. 8, a majority decision is made on both of a group of the received PSK signals, which are in the logical state corresponding to a logical value "0", and a group of the received PSK signals, which are in the logical state corresponding to a logical value "1", representing sampled data obtained within 1 bit width by sampling the received PSK signals, which are employed as an object of the decision, after the receiving state of the circuit is changed into the NRZStart state. In the case of an example of FIG. 8, first, a majority decision is made on 8 PSK signals, which represent the start bit and are received after the synchronization start point. The start bit has a logical value of "0" and is in a Low-state. Therefore, the count or number of the PSK signals in the Low-state is 8, while that of the PSK signals in an High-state corresponding to a logical value of "1" is 0.

Figure 7B:
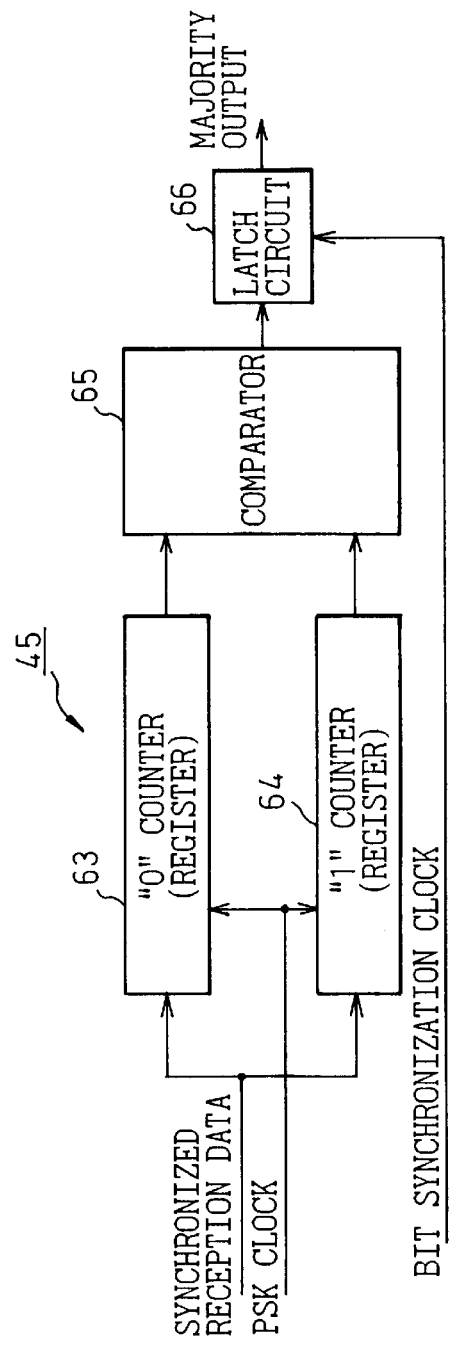
FIG. 7B is a diagram illustrating the constitution of an example of a majority decision circuit.

In this case, the count of the PSK signals having the Low state is greater than that of the PSK signals in the High state. Thus, the logical value of "0" corresponding to the count of the PSK signals in the Low state is selected as the logical value of the start bit. After the sampling of the last (namely, eighth) PSK signal within 1 bit width, the selected value "0" of the start bit is outputted. Thence, similar majority decisions are made on each of the received bits. FIG. 7B shows the constitution of a simple example of a majority decision circuit 45. The received data is supplied to both of a counter 63, which is operative to count the sampled PSK signals representing the logical value "0", and a counter 64 that is operative to count the sampled PSk signals representing the logical value "1". A comparator 65 outputs the logical value "0" or "1" of the majority of the sampled PSK signals.

A latch circuit 66 of the final stage performs a latch operation according to bit synchronization clocks. Consequently, the logical value "0" or "1" of the majority of bits of the received data is outputted as a majority output.

Incidentally, this example is constituted so that a comparison between the values of the two counters is performed only so as to determine which of the values of these counters is greater than the other thereof. However, a simple decoder circuit may be added to the demodulator in such a manner as to judge that a majority decision is impossible when the count of the sampled PSK signals having the logical value "0" is equal to that of the sampled PSK signals having the logical value "1", and as to output an error notification signal while the NRZ signal maintains a previous condition thereof.

Alternatively, the demodulator may be constituted so that a majority decision is made according to a predetermined ratio, for example, when the ratio of the number of the PSK signals representing the logical value "0" to the number of the PSK signals representing the logical value "1" is N:M (where N and M are integers), the logical value "0" is set as the majority output, and when this ratio is less than N:M, the logical value "1" is set as the majority output, instead of making a comparison therebetween simply so as to determine which of the values of these counters is greater than the other thereof. Incidentally, the demodulator may be constructed by using shift registers adapted to shift the contents thereof by bits of the number of the PSK signals representing the logical value "0" or "1", instead of the counters 63 and 64.

FIG. 8 illustrates an example of how the majority decision circuit 45 functions in response to noise. In the case of this example, during the reception of PSK signals representing a second bit directly subsequent to the start bit, fourth and seventh ones of the corresponding eight sampled PSK signals actually have a logical value "0" owing to external noises, whereas all of the eight PSK signals should have a correct logical value "1". As is apparent from the foregoing description, the majority decision circuit 45 correctly outputs a logical value "0" as the value of the second bit, because of the fact that the count of the PSK signals representing the logical value "0" is 2 and thus less than the count, which is 6, of the PSK signals representing the logical value "1". Thus, in the case of the demodulator of the present invention, the noise immunity is considerably enhanced, as compared with that of the conventional demodulator. Consequently, the frequency of the occurrence of malfunctions of the demodulator is significantly reduced.

Figure 9:
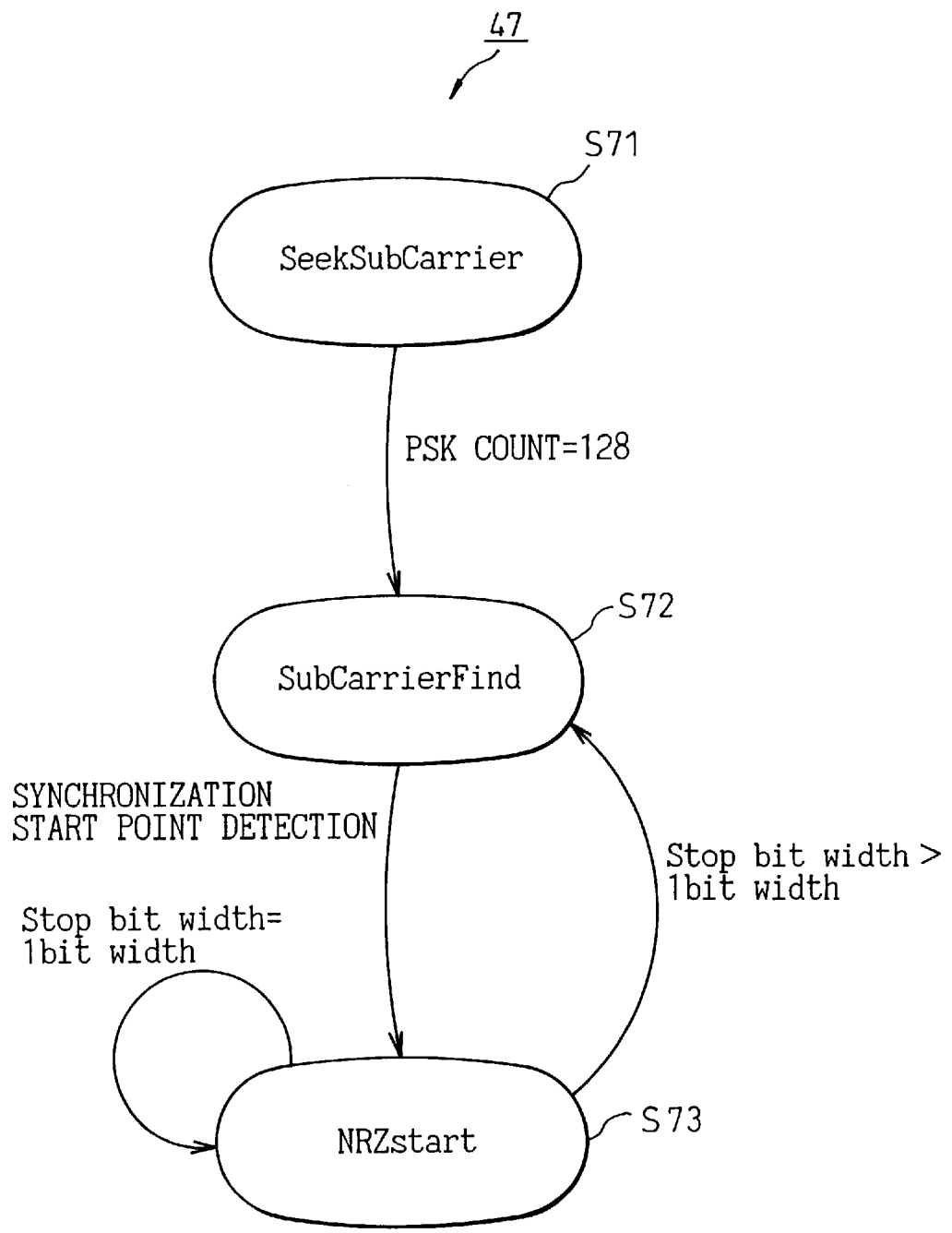
FIG. 9 is a diagram illustrating an example of transition of a receiving state of a state control circuit.
Figure 10:
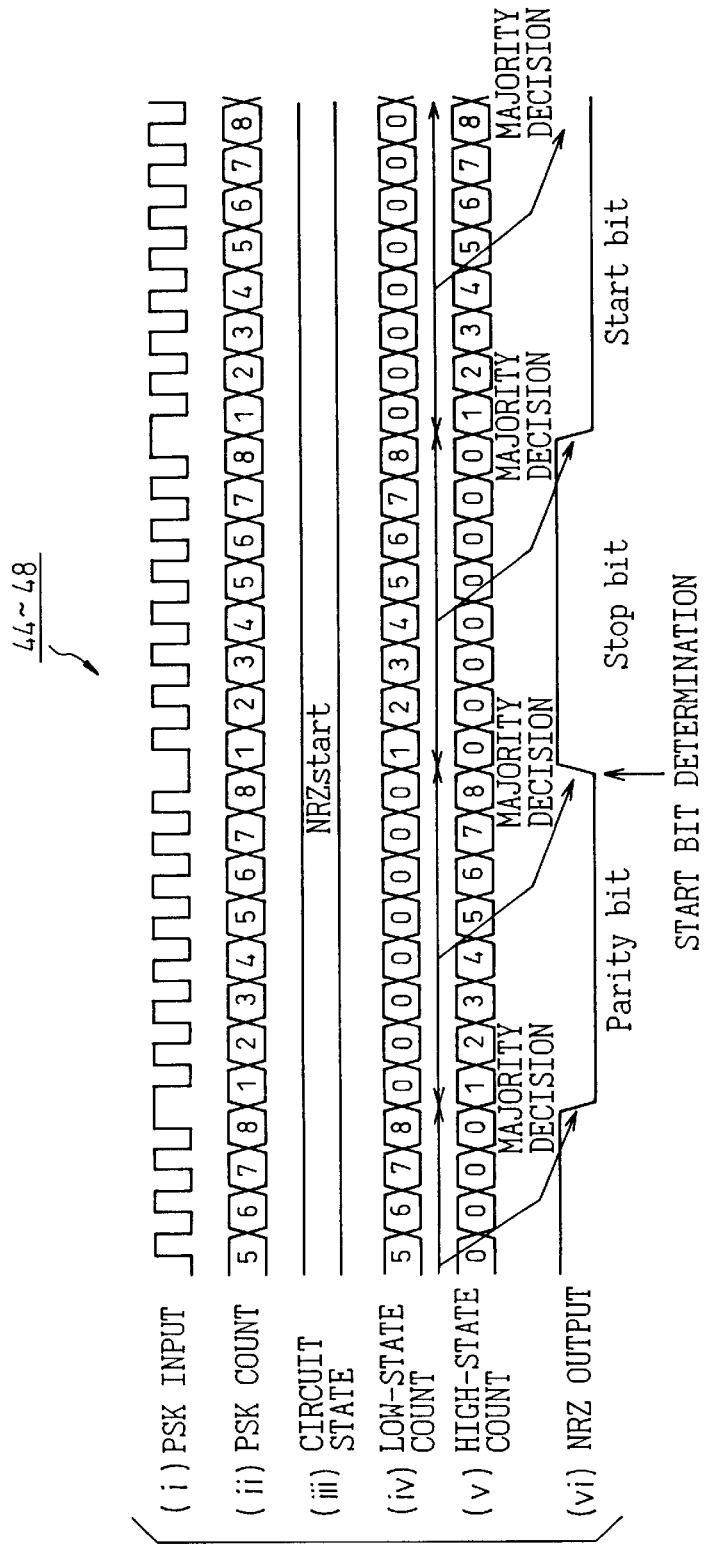
FIG. 10 is a time chart illustrating an example of a data receiving operation in the case that a stop bit width is 1.
Figure 11:
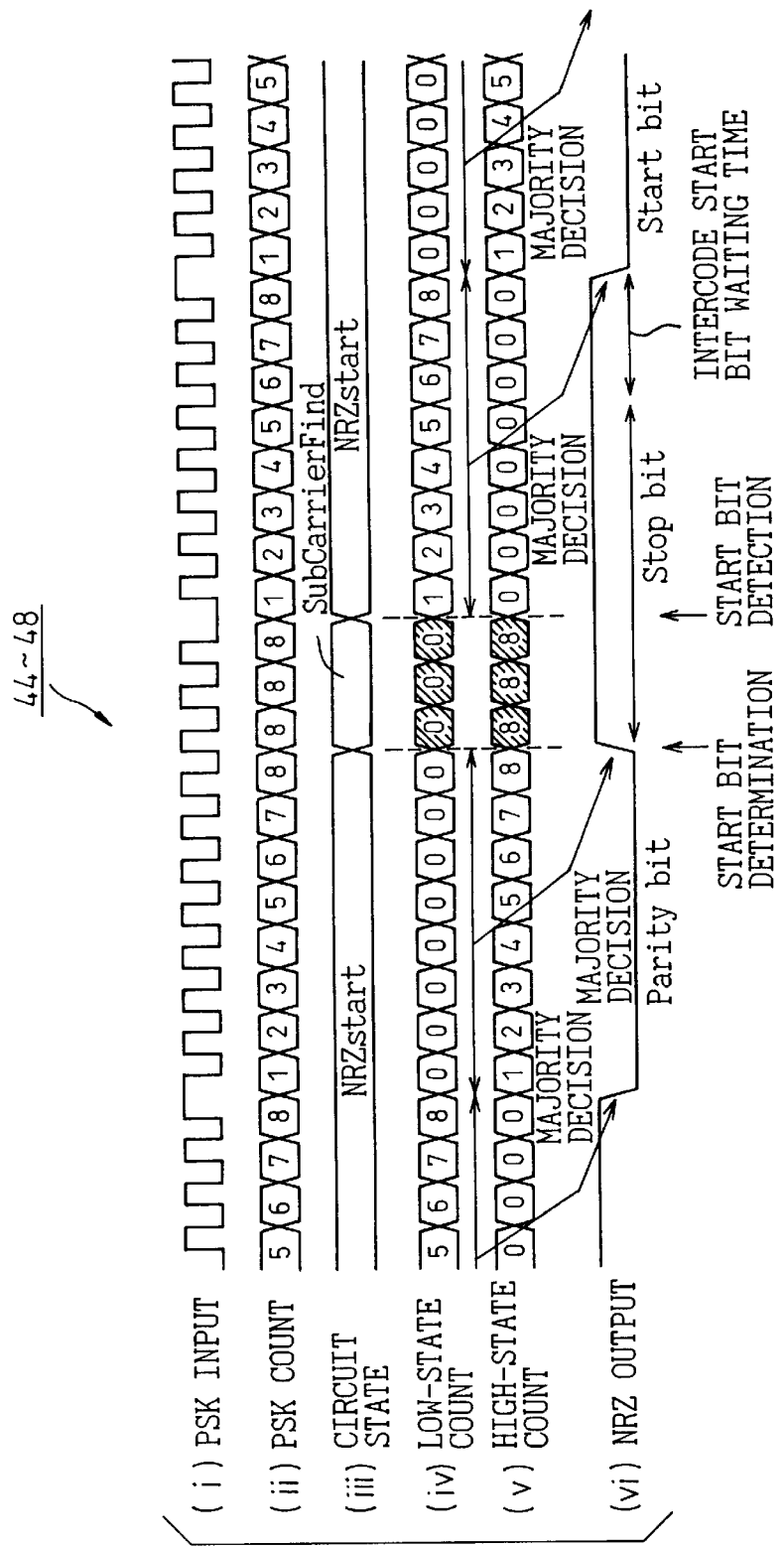
FIG. 11 is a time chart illustrating an example of a data receiving operation in the case that a stop bit width is not less than 1.

FIG. 9 shows an example of the transition of the receiving state under the control of the state control circuit 47. Further, FIGS. 10 and 11 are timing charts each illustrating an example of an operation of receiving a stop bit.

FIG. 9 is drawn mainly for the purpose of illustration of an operation of receiving a start bit according to the present invention. Hence, no additional descriptions of the transition among the SeekSubCarrier state (step S71), the SubCarrierFIND state (step S72), and the NRZStart state (step S73) are provided herein.

In the case of the demodulator of the present invention, upon completion of reception of a start bit having a logical value "1" in the NRZStart state (step S73), a determination circuit 46 of FIG. 5 for making a determination just after a stop bit, determines the value of the next bit. More precisely, the determination circuit 46 determines the logical value of a first PSK signal sampled just after the start point of the next bit. If this logical value is "0", the determination circuit 46 judges that the reception of the next frame is commenced. Thus, the determination circuit 46 maintains the current NRZStart state (at step S73).

Conversely, if the logical value of the first sampled PSK signal is maintained at "1", the determination circuit 46 judges that there is an indefinite time period until the next frame is received. Then, the determination circuit 46 posts such a result of judgement to the state control circuit 47. Thus, the state control circuit 47 causes the transition of the receiving state to the SubCarrierFIND state (at step S72). As a result, the demodulator resumes the aforementioned operation of detecting a synchronization start point. Further, the modulator is enabled to be immediately synchronized with the next frame coming after the lapse of the indefinite time period. Then, an operation of receiving the next frame is commenced.

FIG. 10 is a time chart illustrating an example of an operation of receiving a stop bit in the case that the bit width of the stop bit is 1.

As illustrated in (iv) to (vi) of FIG. 10, after a stop bit having a logical value "1" (incidentally, the count of the corresponding PSK signal in the Low-state is 0, while the count of the corresponding PSK signal in the High-state is 8) is received, the determination circuit 46 determines the start bit. In the case that start bits each having the logical value "0" (incidentally, the count of the corresponding PSK signal in the Low-state is 8, while the count of the corresponding PSK signal in the High-state is 0), similarly to this example, are successively received, the NRZStart state is maintained the circuit state shown in (iii) of this figure. Consequently, the reception of successive frames is enabled.

On the other hand, FIG. 11 is a time chart illustrating an example of an operation of receiving a stop bit in the case that the bit width of the stop bit is not less than 1.

In the case of this example, after a stop bit "1" (incidentally, the count of the corresponding PSK signal in the Low-state is 0, while the count of the corresponding PSK signal in the High-state is 8) is received, sampled three PSK signals having the same logical value "1" (incidentally, the count of the corresponding PSK signal in the Low-state is 0, while the count of the corresponding PSK signal in the High-state is 8) are successively received. In this case, according to a first result of sampling the three PSK signals, the determination circuit 46 posts the termination or suspension of reception of frames to the state control circuit 47.

As shown in (iii) (corresponding to the circuit state) of FIG. 11, the state control circuit 47 immediately causes the transition of the receiving state to the SubCarrierFIND state. Thus, the start bit detecting circuit 44 starts operating. Consequently, at the time of detecting the synchronization start point of a start bit, the reception of which is started just upon completion of reception of the three sampled PSK signals, the sampling synchronization signal generating circuit 42 is initialized (or reset) and immediately synchronized with a newly received frame, as described in the foregoing description.

Furthermore, the state control circuit 47 causes the transition of the receiving state from the SubCarrierFIND state to the NRZStart state. Thus, the operation of receiving the frame is commenced. Consequently, even in the case that the length of the time period between the frames to be received is indefinite, an accurate reception of the frames is achieved. Incidentally, in the aforementioned embodiment, the receiving state is determined according to the value of one of the PSK signals received just after the reception of the stop bit. However, the demodulator may be constituted so that the values of a plurality of bits respectively corresponding to the sampled PSK signals may be used for determining the receiving state, by taking the influence of noise into consideration.

As described above, according to the present invention, the demodulator performs sampling of received signals using signals synchronized with own carrier signals without using the conventional PLL circuit. Moreover, the demodulator performs the detection of a sampling start point and makes a majority decision so as to avoid the influence of noise and to achieve stable demodulation. Thus, the present invention provides a carrier synchronization type demodulator that meets demands for enhancement in noise immunity and for reduction in the cost and size thereof, which should be met when applied to various proximity IC cards.

Furthermore, the present invention provides a carrier synchronization type demodulator for a PSK signal, which is enabled to stably receive successive data, whose data interval is indefinite.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A carrier synchronization type demodulator for a PSK signal, which receives and demodulates PSK-modulated subcarrier signals to be synchronized with and superposed onto a sent carrier signal, said demodulator comprising:

carrier detecting means for detecting the subcarrier signals successively received in a predetermined time;

phase-change-point detecting means for detecting a phase change point of a subcarrier signal after the subcarrier signal is detected;

data reception control means for controlling reception of data of a predetermined format by employing a moment, at which the phase change point is detected, as a synchronization start point for receiving data, and by using an internal clock that is synchronized with the sent carrier signal by using the moment as a starting point of synchronization; and determination means for determining, immediately upon completion of reception of a data frame of the predetermined format, whether reception of the next data frame has not commenced and wherein, when commencement of the reception of the next data frame is not detected, the phase-change-point detecting means immediately starts detecting the phase change point of the subcarrier signal.

2. The demodulator according to claim 1, wherein the data frame of the predetermined format is of the start-stop synchronization type, and wherein when values of sampled subcarrier signals of a predetermined number immediately subsequent to a stop bit indicating an end of a data frame have a same logical value as that of the stop bit, the determination means determines that the commencement of the reception of the next data frame cannot be detected.

3. The demodulator according to claim 1, wherein the predetermined number is 1.

4. A carrier synchronization type demodulator for a PSK signal, which receives and demodulates PSK-modulated subcarrier signals to be synchronized with and superposed onto a sent carrier signal, said demodulator comprising:

a PSK synchronization circuit for converting a received PSK signal into a synchronized reception signal synchronized with an internal clock that is synchronized with the sent carrier signal;

a subcarrier detecting circuit for detecting the subcarrier signals that are supplied from said PSK synchronization circuit and successively received in a predetermined time;

a start bit detecting circuit for detecting a phase change point of a subcarrier signal after the subcarrier signal is detected;

a sampling synchronization signal generating circuit for generating clocks to be used for sampling received data of a predetermined format by employing a moment, at which the phase change point is detected, as a synchronization start point for receiving data, and by using the internal clock obtained by using the moment as a starting point of synchronization;

an NRZ signal generating circuit for outputting a NRZ signal, which is received by using clocks outputted from said sampling synchronization signal generating circuit, as a signal representing NRZ reception data of the predetermined format; and a state control circuit for controlling transition among a SeekSubCarrier state lasting until a subcarrier signal is detected by said subcarrier detecting circuit, a SubCarrierFIND state thereafter remaining until the phase change point of the subcarrier signal is detected by said start bit detecting circuit, and an NRZstart state thereafter remaining while data is received.

5. The demodulator according to claim 4, which further comprises a majority decision circuit for making a majority decision on a plurality of values respectively represented by sampled subcarrier signals, which provide logical values "0" and "1" of data bits when the data is received, in the NRZStart state, and for deciding that the logical value "0" or "1" of the majority of the data bits is set to be the logical value of each thereof.

6. The demodulator according to claim 4 or 5, which further comprises determination means for determining a stop bit width of a data frame of the data of the predetermined format, wherein the data of the predetermined format is of a start-stop synchronization type, immediately subsequent to a stop bit, and wherein when said determination means determines that the stop bit width is not less than 1, said state control circuit immediately changes a receiving state into the SubCarrierFIND state, so that said start bit detecting circuit immediately starts detecting a phase change point of the subcarrier signal.

* * * * *